(12) United States Patent
Eckhardt

(10) Patent No.: US 7,908,926 B2
(45) Date of Patent: Mar. 22, 2011

(54) APPARATUS AND METHOD FOR PRESSURE SENSING

(75) Inventor: Todd Eckhardt, Westerville, OH (US)

(73) Assignee: Honeywell International Inc., Morristown, NJ (US)

( * ) Notice: Subject to any disclaimer, the term of this patent is extended or adjusted under 35 U.S.C. 154(b) by 546 days.

(21) Appl. No.: 11/937,654

(22) Filed: Nov. 9, 2007

(65) Prior Publication Data

US 2009/0120196 A1      May 14, 2009

(51) Int. Cl.
*G01L 7/00*          (2006.01)
(52) U.S. Cl. ......................................................... 73/756
(58) Field of Classification Search ......................... None
See application file for complete search history.

(56) References Cited

U.S. PATENT DOCUMENTS

| | | | | |
|---|---|---|---|---|
| 5,531,120 A | * | 7/1996 | Nagasu et al. | 73/706 |
| 5,583,294 A | * | 12/1996 | Karas | 73/706 |
| 5,648,615 A | * | 7/1997 | Jeske et al. | 73/756 |
| 6,227,055 B1 | * | 5/2001 | Pitzer | 73/715 |
| 6,691,579 B2 | * | 2/2004 | Orr et al. | 73/700 |
| 6,907,789 B2 | | 6/2005 | Bodin | |
| 2003/0015154 A1 | | 1/2003 | Kolb et al. | |

* cited by examiner

*Primary Examiner* — Lisa M Caputo
*Assistant Examiner* — Jermaine Jenkins

(57) ABSTRACT

An apparatus and method of pressure sensing. The system can include a sensing apparatus connectable with a supply conduit and a mounting plate. The apparatus can include a coupling device for receiving the supply conduit, a housing having first and second openings in fluid communication with each other where the first opening receives at least a portion of the coupling device, and a sensing device having an insertion portion and a sensing area. The insertion portion can be received in the second opening of the housing. A first connection between the housing and the mounting plate can be remote from the sensing area, and a second connection between the housing and the sensing device can be remote from the sensing area.

22 Claims, 9 Drawing Sheets

APPARATUS AND METHOD FOR PRESSURE SENSING

FIELD OF THE INVENTION

This disclosure relates generally to monitoring or control systems and more specifically to an apparatus and method for pressure sensing.

BACKGROUND

Various industrial, commercial, aerospace and military systems depend on reliable sensors for data acquisition, such as pressure sensors for fluid (e.g., gas) handling. Pressure sensors can be used to measure fluidic pressure in a variety of different areas of the system and/or process.

Additionally, processing facilities, such as manufacturing plants, chemical plants and oil refineries, are typically managed using process control systems that rely in part on data obtained from sensors. Valves, pumps, motors, heating or cooling devices, and other industrial equipment typically perform actions needed to process materials in the processing facilities, and are adjusted in part based on the data obtained from the sensors, such as pressure sensors.

The sensors are often subjected to harsh environments and a variety of conditions that can adversely effect the quality of the data retrieved by the sensor. Various forces applied to the sensor can cause inaccurate measurements, such as measurements of pressure. These inaccuracies can be exacerbated where the measurements are small or the accuracy required is of a high degree.

Accordingly, there is a need for an apparatus and method for sensing that can obtain a desired degree of accuracy in adverse conditions. There is a further need for such an apparatus and method that reduces the adverse effects on measurements when various forces are applied to the sensor.

SUMMARY

The Summary is provided to comply with 37 C.F.R. §1.73, requiring a summary of the invention briefly indicating the nature and substance of the invention. It is submitted with the understanding that it will not be used to interpret or limit the scope or meaning of the claims.

In one exemplary embodiment of the present disclosure, a pressure sensing apparatus connectable with a supply conduit and a mounting structure is provided. The apparatus can include a housing having a coupling device and being removably connectable with the mounting structure where the coupling device is removably connectable with the supply conduit. The apparatus can also include a pressure sensing device having a sensing structure and being connected to the housing. The sensing structure can be in fluid communication with the supply conduit where a first connection between the housing and the mounting structure is remote from the sensing structure.

In another exemplary embodiment, a sensing apparatus connectable with a supply conduit and a mounting plate is provided. The apparatus can include a coupling device for receiving the supply conduit, a housing having first and second openings in fluid communication with each other where the first opening receives at least a portion of the coupling device, and a sensing device having an insertion portion and a sensing area. The insertion portion can be received in the second opening of the housing. A first connection between the housing and the mounting plate can be remote from the sensing area, and a second connection between the housing and the sensing device can be remote from the sensing area.

In a further exemplary embodiment, a method of sensing pressure can include providing a conduit to supply a fluid, providing a mounting plate in proximity to the conduit, press fitting the conduit into a coupling device of a sensor assembly to provide the fluid to a sensing area of the sensor assembly, positioning a housing of the sensor assembly partially through an opening in the mounting plate, connecting the housing with the mounting plate, and translating at least one of an axial force, a traverse force and a torsional force associated with the conduit to one or more connection points of the sensor assembly that are remote from the sensing area of the sensor assembly.

The technical effect includes, but is not limited to, allowing for accurate and repeatable measurements. The technical effect further includes, but is not limited to, translating forces away from the sensing area of the device to allow for accurate and repeatable measurements.

The above-described and other features and advantages of the present disclosure will be appreciated and understood by those skilled in the art from the following detailed description, drawings, and appended claims.

DETAILED DESCRIPTION OF THE INVENTION

Figure 1:
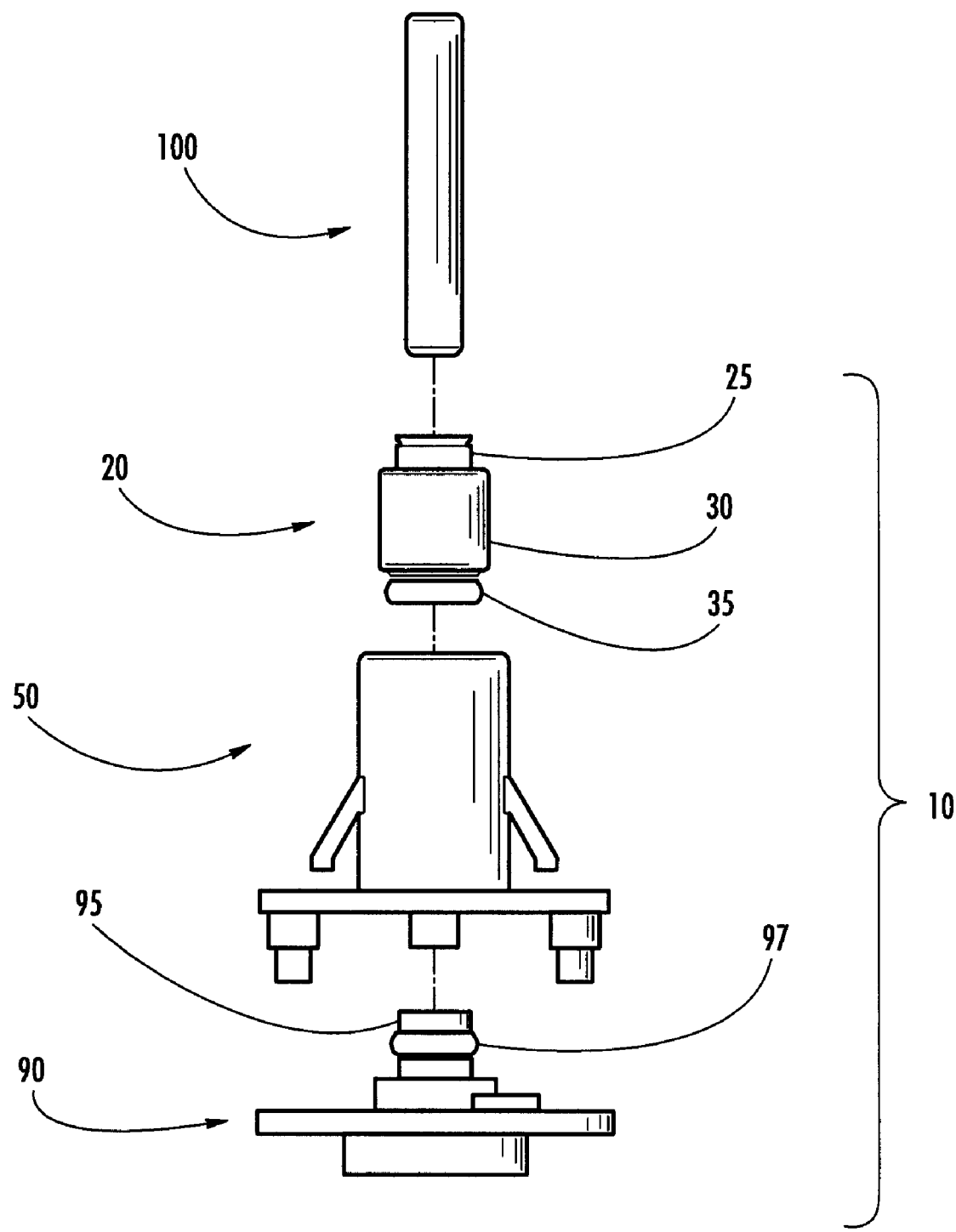
FIG. 1 is an exploded view of a pressure sensing system according to an embodiment of the present invention.
Figure 2:
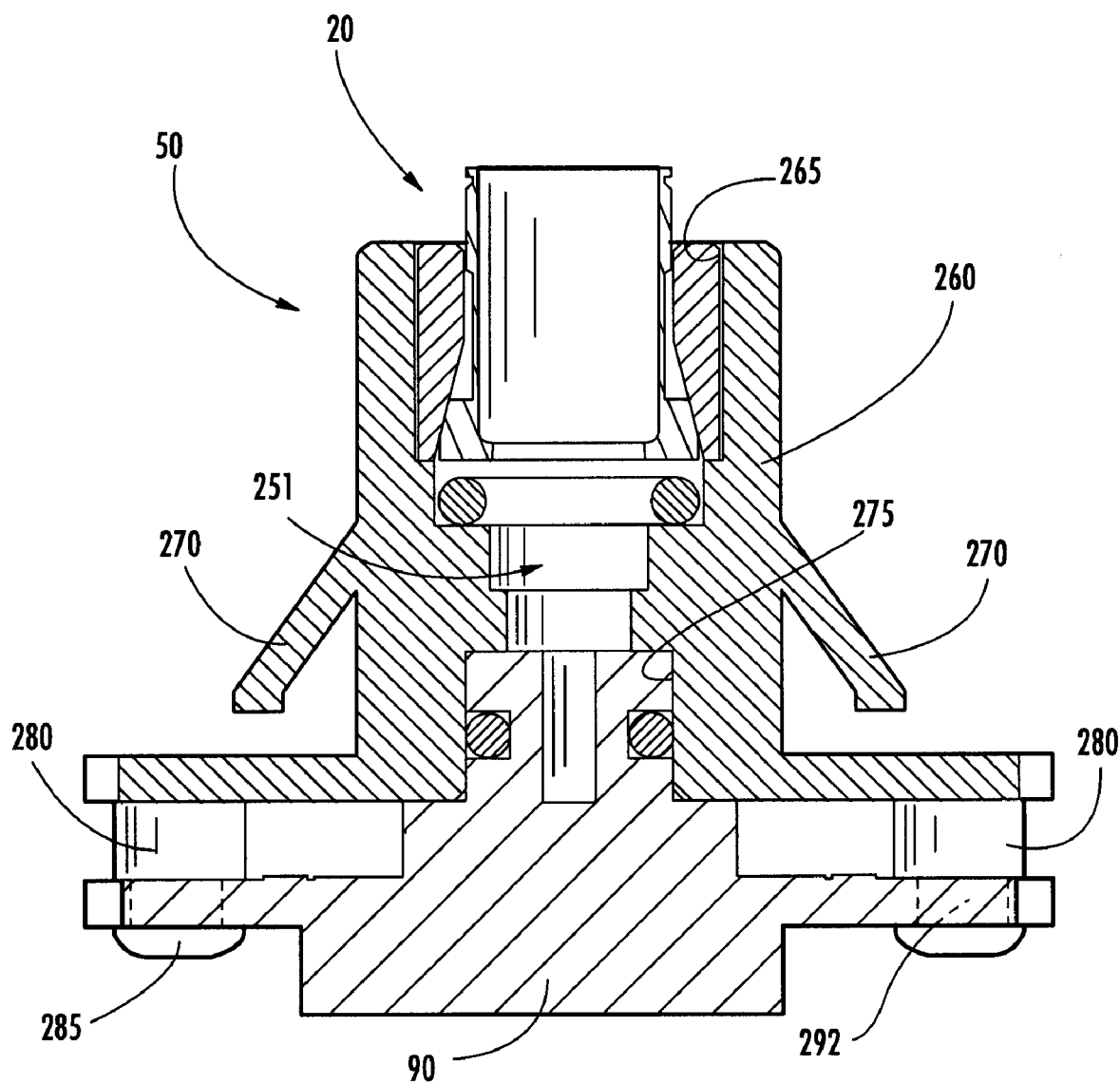
FIG. 2 is a cross-sectional view of a portion of the sensing system of FIG. 1.
Figure 3:
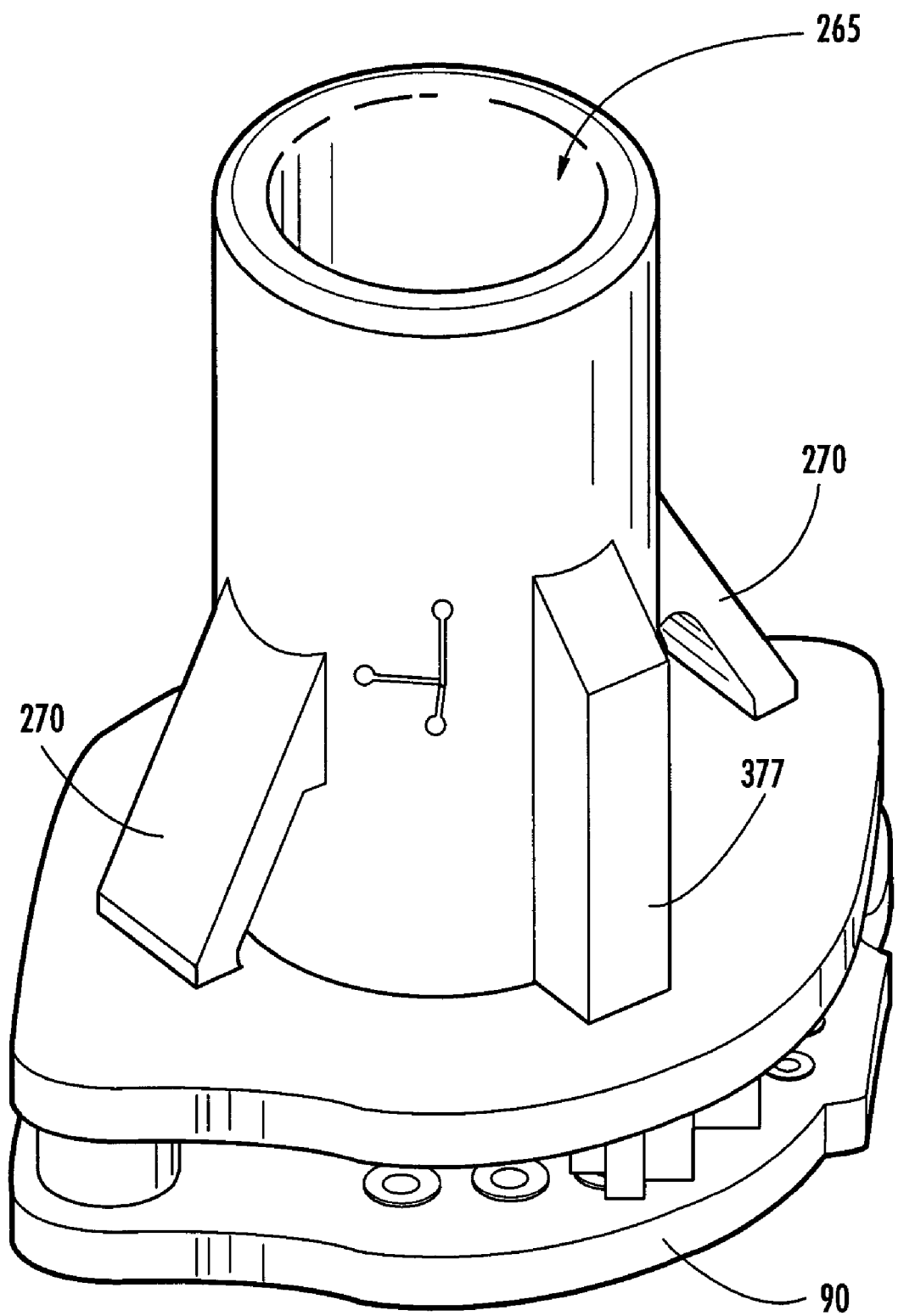
FIG. 3 is a perspective view of a portion of the sensing system of FIG. 1.
Figure 4:
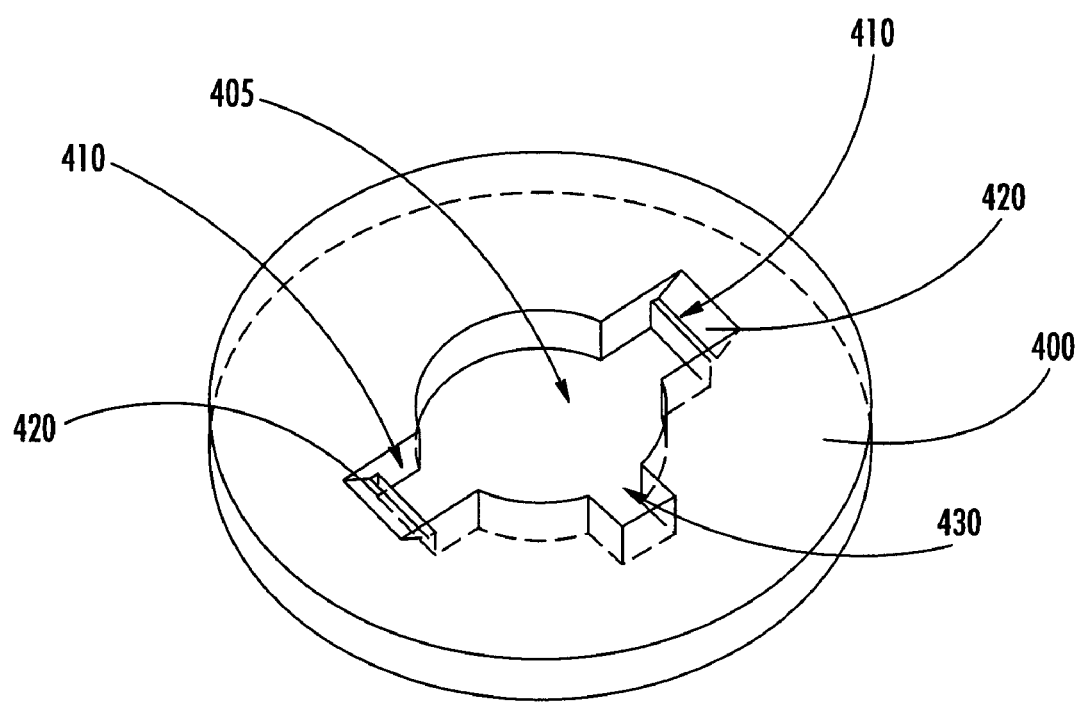
FIG. 4 is a perspective view of a mounting plate usable with the sensing system of FIG. 1.
Figure 5:
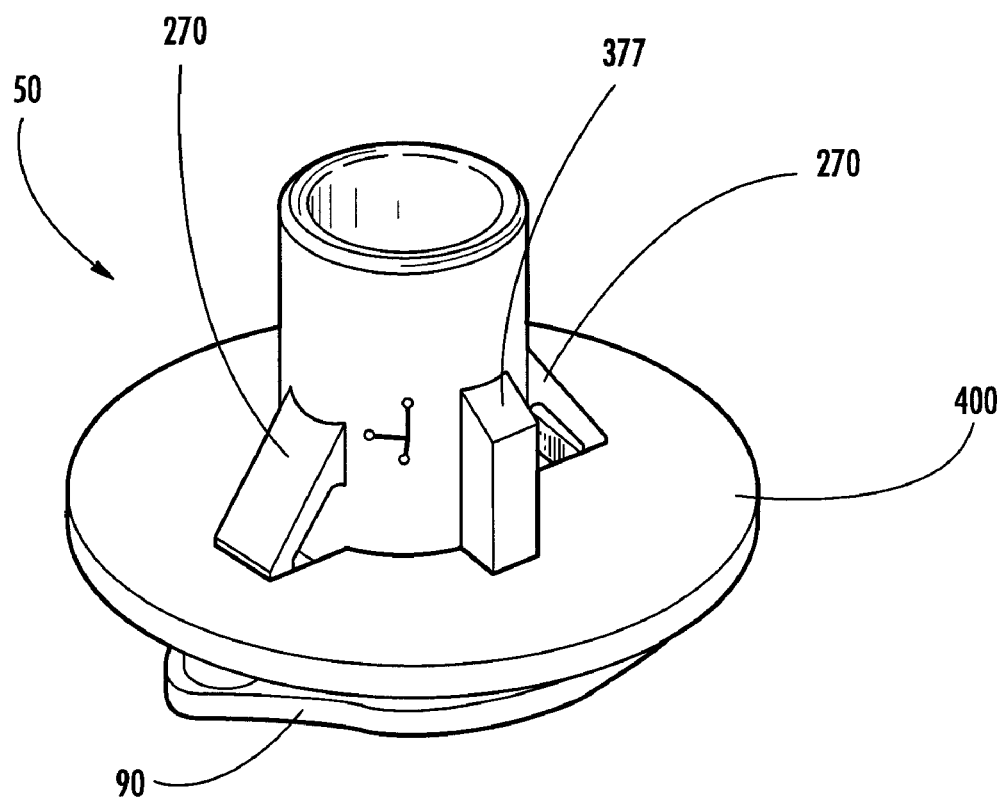
FIG. 5 is a perspective view of the mounting plate of FIG. 4 with a portion of the sensing system of FIG. 1.

Referring to the drawings, and in particular to FIG. 1, a pressure measurement or monitoring system in accordance with an exemplary embodiment of the invention is shown and generally represented by reference numeral 10. System 10 can be used with various devices, systems, processing facilities, as well as various processes and/or various samples. The particular type of device, system, facility or process and/or the particular type of sample that is to be monitored, measured and/or controlled is not intended to be limited.

System 10 can be in communication with, coupled to, or part of, a control system (not shown) that can provide for control of a device, system or process. In one embodiment, the system 10 can obtain data (e.g., pressure data) associated with a process, where the pressure data is used for adjusting control devices, including valves and the like. In another embodiment, the system 10 is in communication with, coupled to, or part of, a display system or graphical user interface (not shown) that can present the pressure data obtained by the system, such as through a readout on a desktop computer or LED display.

System 10 can detect a pressure of a fluid through use of a sensing device 90, where the fluid is supplied to the sensing device 90 through a tube 100 or other supply conduit. The sensing device 90 can utilize various components and techniques for detecting the pressure of the fluid. For example, the sensing device 90 can be a piezoresistive silicon sensor having a number of piezoresistors positioned in a thin, chemically-etched silicon diaphragm, where a pressure change of the fluid causes the diaphragm to flex or deform, inducing a stress in the diaphragm and the resistors. The resistance values can change in proportion to the stress applied and produce a corresponding electrical output that is monitored. The sensing device 90 can measure absolute, differential and gage pressure, including vacuum gage and bi-directional pressure. Various pressure ranges can be measured by the sensing device 90, and the measurements can be amplified or unamplified, as well as filtered.

The present disclosure contemplates the use of other measurement techniques or devices for sensing device 90, including, but not limited to, a strain gauge where the changes in conductivity of a material due to change in its stretch or strain is monitored; a fiber optic sensor where fiber optic interferometers sense nanometer scale displacement of membranes; mechanical deflection where the mechanical properties of a fluid are monitored to measure pressure such as the changes of compression of a spring; microelectromechanical systems (MEMS) where tiny mechanical systems such as valves, gears, and/or other mechanical systems on a semiconductor chip utilize nanotechnology to measure pressure; vibrating elements (e.g., silicon resonance) where the change in vibration on the molecular level of different materials is monitored; and variable capacitance where the change of capacitance due to change of the distance between the plates of a capacitor due to change in pressure are used to calculate the pressure.

The present disclosure also contemplates the sensing device 90 measuring other properties of a device, system or process, such as forces applied thereto. For example, the sensing device 90 can be a piezoresistive silicon sensor having a plunger, where the resistance of the silicon implanted piezoresistors increases when the resistors flex under any applied force. The sensing device 90 can concentrate the force from the application through the stainless steel plunger directly to the silicon sensing element. The amount of resistance can change in proportion to the amount of force being applied and can be monitored for a corresponding change in voltage output level.

Referring additionally to FIGS. 2-7, system 10 can include a coupling device 20, such as a quick-connect cartridge including a LEGRIS® cartridge, for placing the tube 100 in fluid communication with the sensing device 90. The coupling device 20 can include a sleeve 25 that accepts the tube 100, a collet or collar 30 that provides support for the sleeve 25, and an o-ring or other sealing structure 35 that seals the tube with a housing 50 of the system 10. The coupling device 20 can allow for a press fit connection with the tube 100. However, the present disclosure contemplates other types of sealed connections being made between the tube 100 and the coupling device 20, such as a threaded or bayonet connection.

The housing 50 can have a body 260 with an upper opening 265 that receives at least a portion of the coupling device 20 and a lower opening 275 that receives at least a portion of the sensing device 90. In one embodiment, the upper opening 265 can have a stepped configuration with a larger inner diameter to receive the collet 30 of the coupling device 20, and a smaller inner diameter to receive the o-ring 35 of the coupling device.

In another embodiment, the sensing device 90 can include an insertion portion 95 that is received in the lower opening 275, and an o-ring or other sealing structure 97 that seals the insertion portion with the housing 50. The o-ring 97 can be positioned in a circumferential groove formed along the insertion portion 95. The insertion portion 95 can include a channel 698 therethrough that provides fluid communication between the tube 100 and a membrane 691 or other sensing material or structure of the sensing device.

The housing 50 can have a center channel 251 defined through the body 260 of the housing. The center channel 251 can provide fluid communication between the upper and lower openings 265, 275 of the housing 50 so that the tube 100 and the channel 698 of the sensing device 90 are in communication. The particular size, shape and configuration of the center channel 251 can vary. In one embodiment, the center channel 251 can have a stepped configuration with a larger inner diameter adjacent to the upper opening 265 and a smaller inner diameter adjacent to the lower opening 275.

The housing 50 can be connected to the sensing device 90 through use of one or more fastening structures 280. In the exemplary embodiment, there are two fastening structures or posts 280 that are positioned along a periphery of a flange of the housing 50, but the present disclosure contemplates more or less of the structures and/or different configurations of the structures. In one embodiment, the fastening structures 280 can be secured through corresponding holes 292 formed through the sensing device 90. In another embodiment, the fastening structures 280 can each have distal ends 285 that are heat-staked with the holes 292. However, the present disclosure also contemplates the use of other fastening structures and techniques to secure the sensing device 90 with the housing 50, including adhesives and/or removable connections e.g., bolts).

The assembled housing 50 and sensing device 90 are connectable with a mounting plate 400 (FIG. 5) or other mounting structure that can be positioned on the device or system that is to be monitored. In one embodiment, the assembled housing 50 and sensing device 90 are removably connectable with the mounting plate 400 so that the sensing device 90 can be removed and changed when necessary, such as for maintenance.

The mounting plate 400 can have a central opening 405 for positioning a portion of the housing 50 therethrough. The housing 50 can have one or more locking arms 270 that correspond with recesses 410 of the mounting plate 400. The locking arms 270 can have a size and shape that allow some flexibility so that the arms can pass through the recesses 410 and abut against the edges or surfaces 420 of the mounting plate 400. In one embodiment, the edges 420 can be chamfered or otherwise angled to facilitate the fastening of the locking arms 270 with the mounting plate 400. The number and configuration of the locking arms 270 can vary, and can also include one or more pairs of locking arms that are diametrically opposed with respect to the body 260 of the housing 50. The locking arms 270 can also be equidistantly spaced about the circumference of the housing 50. In one embodiment, the housing 50 can include a tongue 377 that corresponds with a groove 430 to facilitate alignment of the housing with the mounting plate 400.

Figure 6:
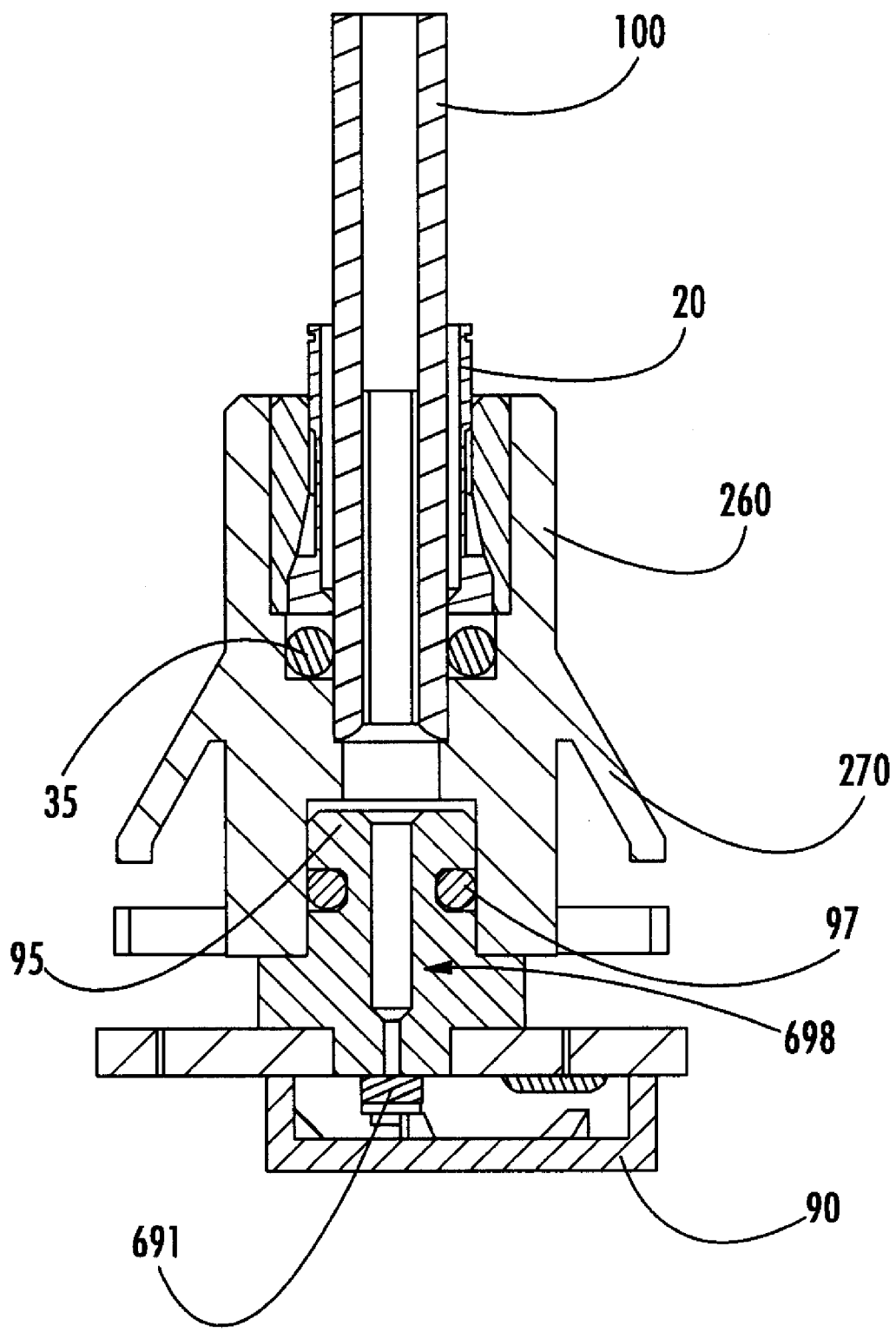
FIG. 6 is another cross-sectional view of a portion of the sensing system of FIG. 1.
Figure 7:
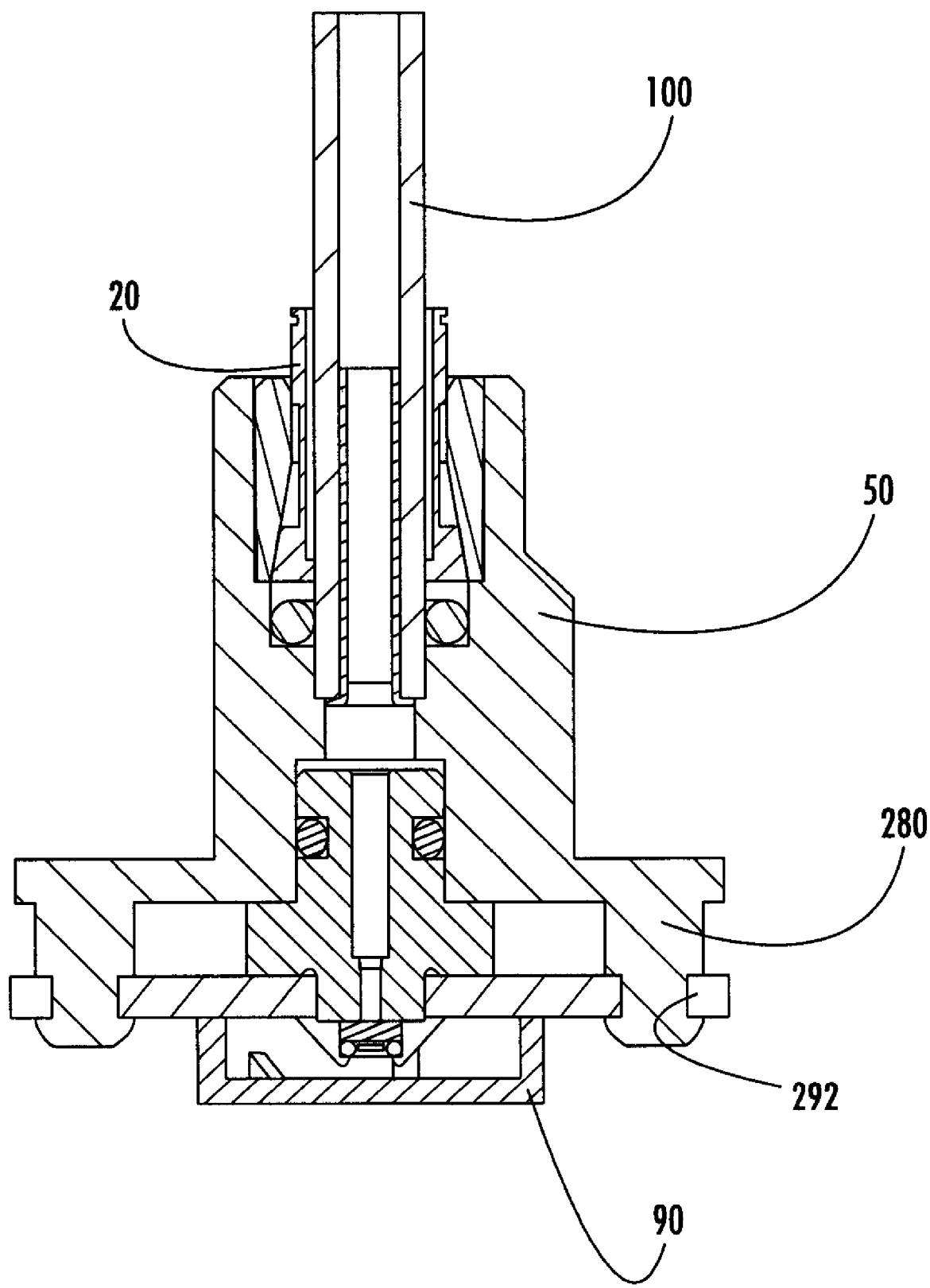
FIG. 7 is another cross-sectional view of a portion of the sensing system of FIG. 1.
Figure 8:
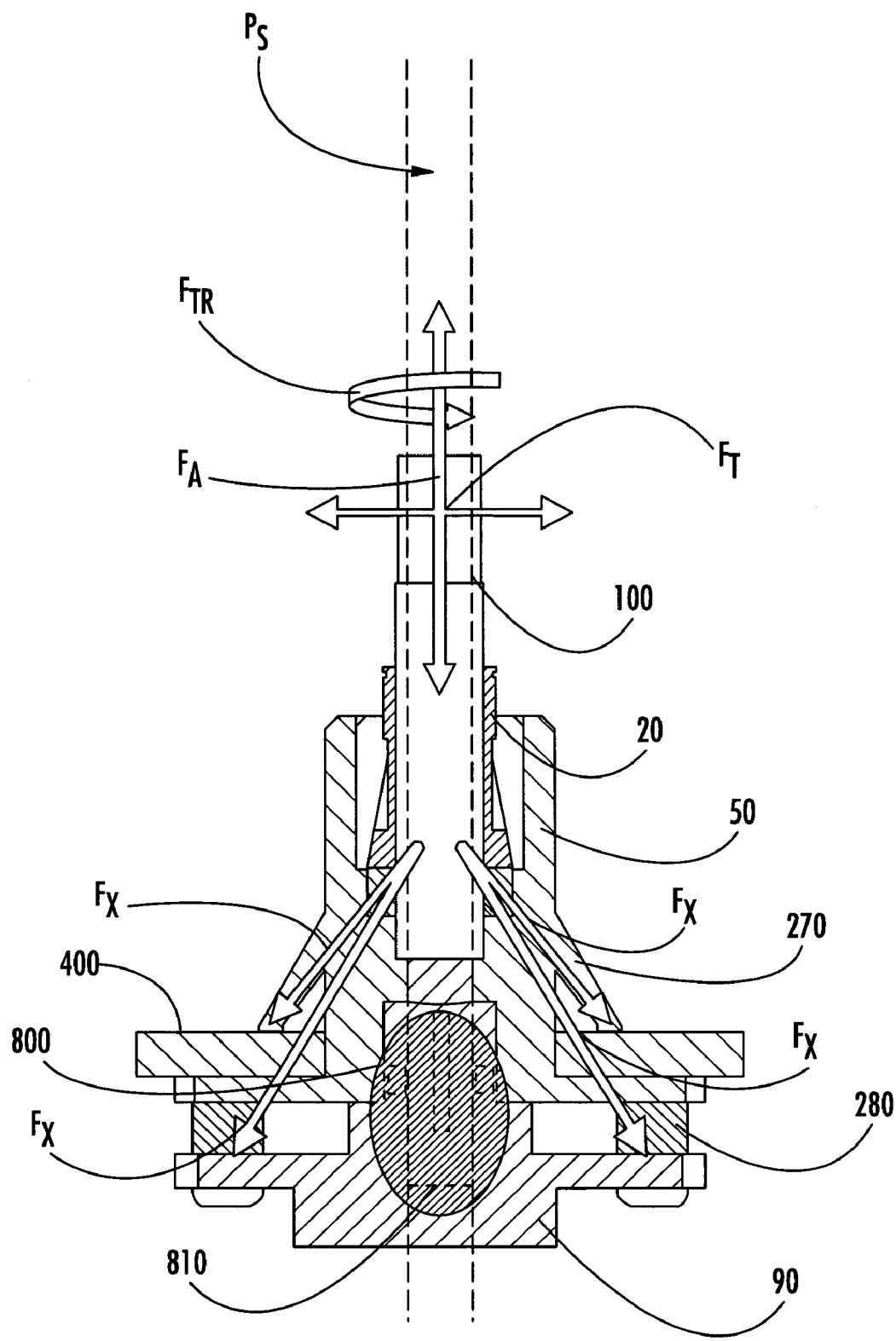
FIG. 8 is a cross-sectional view of the sensing system of FIG. 1 showing applied forces associated with the supply conduit.
Figure 9:
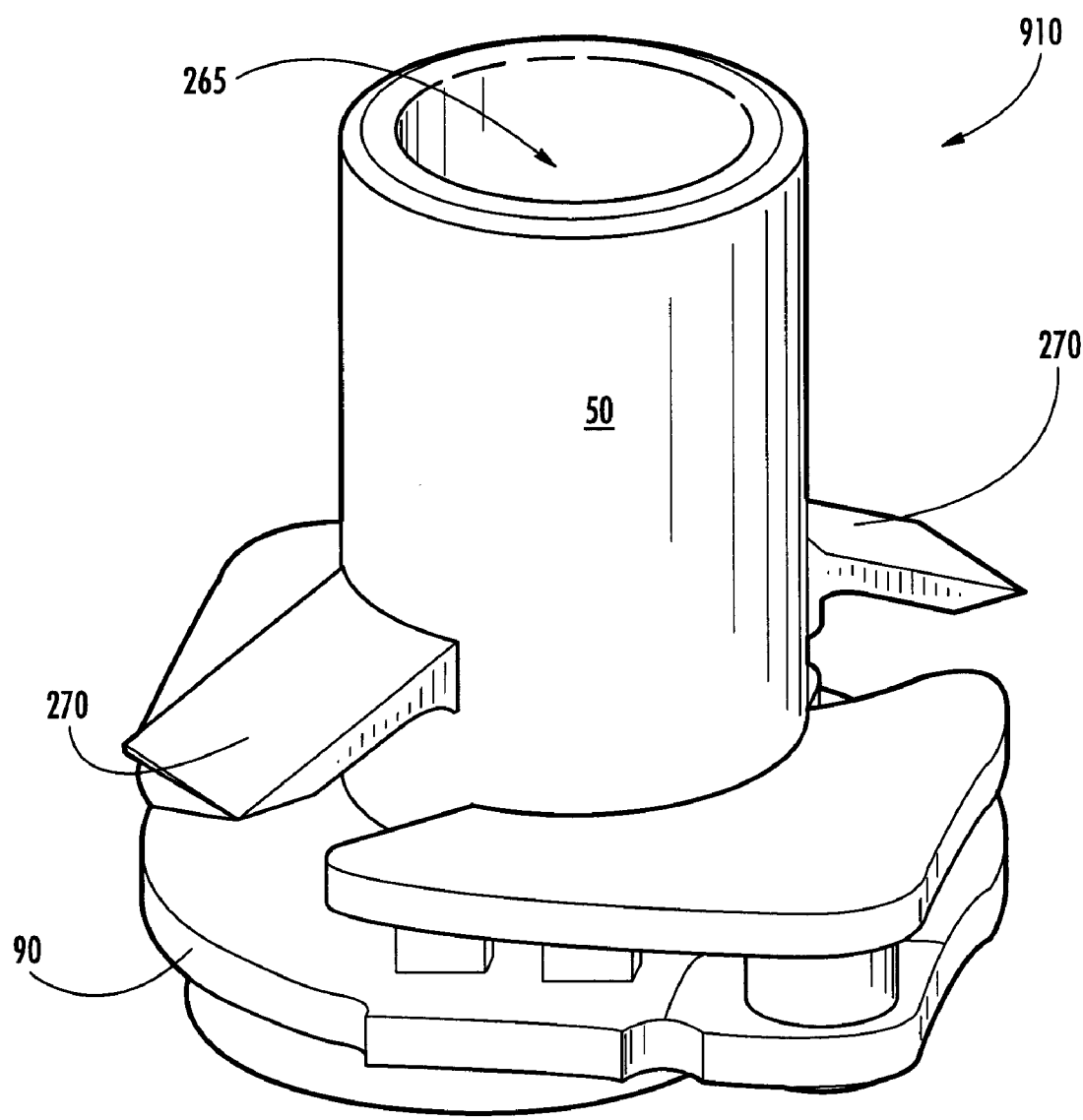
FIG. 9 is a perspective view of a portion of a sensing system according to another embodiment of the present invention.
Figure 10:
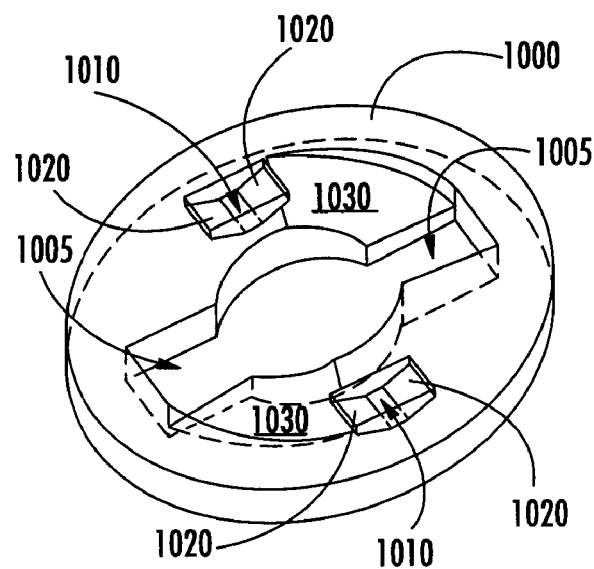
FIG. 10 is a perspective view of a mounting plate usable with the sensing system of FIG. 9.
Figure 11:
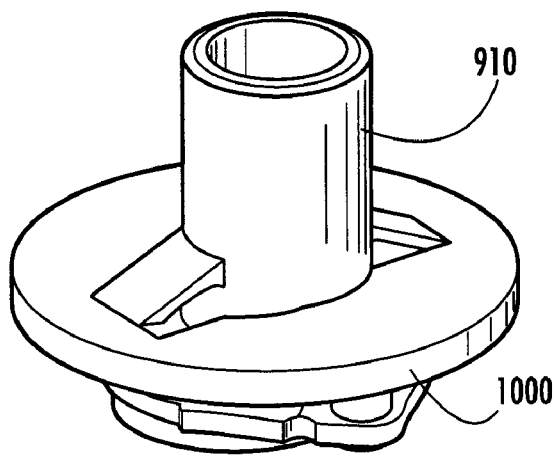
FIG. 11 is a perspective view of the mounting plate of FIG. 10 with a portion of the sensing system of FIG. 9 in an unlocked position.
Figure 12:
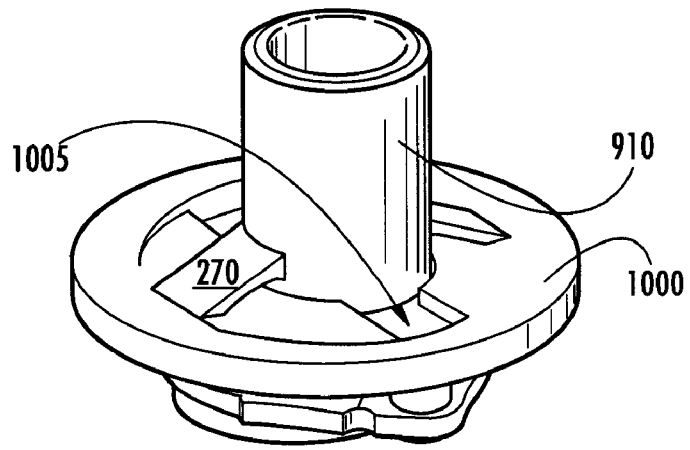
FIG. 12 is a perspective view of the mounting plate of FIG. 10 with a portion of the sensing system of FIG. 9 in a locked position.

Referring additionally to FIG. 8, system 10 is shown connected to the tube 100 so that a fluid is supplied to the sensing device 90. Various forces associated with the tube 100 and/or the system to be monitored may be applied to the system 10, which can have one or more of an axial component $F_A$, a traverse component $F_T$ and a torsional component $F_{TR}$. System 10 can also have a pressure sensing region 800 and a pressure sensing area 810. The pressure sensing region 800 can be in proximity to the membrane 691 (FIG. 6). In one embodiment, the pressure sensing region 800 can be positioned in substantial axial alignment with the tube 100 or the pressure path. The pressure sensing area 810 can be along one or more surfaces of the sensing device 90 and can include the membrane 691 or other active sensing area. In one embodiment, the pressure sensing area 810 can be positioned in substantial axial alignment with the tube 100 or pressure path, and can include the membrane 691. In another embodiment, the pressure sensing area 810 can be positioned in substantial alignment with the tube 100 or pressure path, and can include the membrane 691, as well as extend beyond the membrane 691.

The connection of the locking arms 270 with the mounting plate 400, as well as the connection of the fastening structures 280 with the sensing device 90 can translate the forces $F_X$ remotely from the pressure sensing region 800, the pressure sensing area 810 and/or the pressure path. In one embodiment, the connections between the housing 50, the sensing device 90 and the mounting plate 400 can be positioned so that they are not axially aligned (along the longitudinal axis of the housing 50 and sensing device 90) with either the pressure sensing region 800 or the pressure sensing area 810. In the present disclosure, the term remote can describe a distance or location away from the sensing area 810 and/or the pressure path such that the quality or accuracy of the data (e.g., pressure measurements) retrieved is maintained at a desired level. The particular quality or accuracy can depend on a number of factors, including the level of pressure being monitored. Remote can include an area adjacent to the pressure sensing area 810 and/or pressure path, but can also include an area that is not adjacent thereto, such as having a buffer region in between. The size of the buffer region can also vary depending on the level of quality or accuracy for the data that is desired.

In the exemplary embodiment shown more clearly in FIG. 8, the connections between the housing 50, the sensing device 90 and the mounting plate 400 can be positioned to translate the forces $F_X$ outside of the pressure sensing region 800 and the pressure sensing area 810. For example, the tube 100 can define a planar section $P_S$ passing through the housing 50. The sensing membrane 691 can be positioned within the planar section $P_S$. The connections between the housing 50, the sensing device 90 and the mounting plate 400 can be positioned so as to be outside of the planar section $P_S$.

Referring to FIGS. 9-12, where similar features are labeled by the same reference numerals as in FIGS. 1-8, a system 910 can have the housing 50 connectable with a mounting plate 1000 through use of the one or more locking arms 270. The housing 50 can be twist-locked into position with the mounting plate 1000 by passing the locking arms 270 through openings 1005 in the plate and then twisting the housing 50 until the locking arms are engaged with locking recesses 1010. In this exemplary embodiment, the twisting motion is 90 degrees but other orientations and configurations can also be used. The locking recesses 1010 can have chamfered or tapered edges 1020 to facilitate the connection. The surface 1030 between the openings 1005 and the locking recesses 1010 can be angled to facilitate the twisting motion.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Therefore, it is intended that the disclosure not be limited to the particular embodiment(s) disclosed as the best mode contemplated for carrying out this invention, but that the invention will include all embodiments falling within the scope of the appended claims.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

What is claimed is:

1. A pressure sensing apparatus connectable to a supply conduit and a mounting structure, the apparatus comprising:
    a pressure sensing device;
    a housing removably connectable with the mounting structure;
    the housing having a first aperture for removably receiving the supply conduit, with a first seal situated in the first aperture for providing a seal between the housing and the supply conduit;
    the housing further having a second aperture for receiving an insertion portion of the pressure sensing device including a pressure sensing element, with a second seal situated in the second aperture for providing a seal between the housing and the insertion portion of the pressure sensing device, at least part of the pressure sensing device extending outside of the second aperture;
    the first aperture of the housing being in fluid communication with the second aperture of the housing such that the pressure sensing element of the insertion portion of the pressure sensing device is in fluid communication with the supply conduit.

2. The apparatus of claim 1, wherein the pressure sensing device is secured to the housing at one or more locations that are spaced laterally away from the second aperture.

3. The apparatus of claim 2, wherein the supply conduit defines a planar section passing through the housing, and wherein the pressure sensing element of the pressure sensing device is within the planar section, and wherein the housing is secured to the mounting structure and the pressure sensing device is secured to the housing at one or more locations that are outside of the planar section.

4. The apparatus of claim 1, wherein the mounting structure includes a mounting plate, wherein a portion of the housing is positioned through an opening of the mounting plate, and wherein the housing has one or more locking arms that abut against the mounting plate to removably connect the housing to the mounting structure.

5. A pressure sensing apparatus connectable with a supply conduit and a mounting structure, the apparatus comprising:
    a housing having a coupling device and being removably connectable with the mounting structure, the coupling device being removably connectable with the supply conduit; and
    a pressure sensing device having a sensing structure and being connected to the housing, the sensing structure being in fluid communication with the supply conduit for receiving a fluid, wherein a first connection between the housing and the mounting structure is remote from the sensing structure; and
    wherein the housing has one or more fastening structures that are positioned partially through corresponding holes in the pressure sensing device to form a second connection between the housing and the pressure sensing device.

6. The apparatus of claim 5, wherein the one or more fastening structures are heat staked into the corresponding holes in the pressure sensing device.

7. A sensing apparatus connectable with a supply conduit and a mounting plate, the apparatus comprising:
    a housing having first and second openings in fluid communication with each other, the first opening receiving at least a portion of the supply conduit; and
    a sensing device having an insertion portion with a sensing area, the insertion portion being received in the second opening of the housing with at least part of the sensing device extending outside of the second opening, wherein a first connection between the housing and the mounting plate is laterally spaced from the sensing area, and wherein a second connection between the housing and the sensing device is laterally spaced from the sensing area of the sensing device.

8. The apparatus of claim 7, wherein a portion of the housing is positioned through an opening of the mounting plate, and wherein the housing has one or more locking arms that abut against the mounting plate to form the first connection.

9. The apparatus of claim 8, wherein the one or more locking arms are flexible.

10. The apparatus of claim 8, wherein the one or more locking arms are laterally spaced from the sensing area of the sensing device and spaced substantially equi-distantly along a circumference of the housing.

11. The apparatus of claim 7, wherein the sensing area of the sensing device has a membrane, wherein the membrane is deformable for sensing pressure.

12. The apparatus of claim 7, wherein the supply conduit defines a planar section passing through the housing, and wherein the first and second connections are outside of the planar section.

13. A sensing apparatus connectable with a supply conduit and a mounting plate, the apparatus comprising:
    a coupling device for receiving the supply conduit;
    a housing having first and second openings in fluid communication with each other, the first opening receiving at least a portion of the coupling device; and
    a sensing device having an insertion portion and a sensing area, the insertion portion being received in the second opening of the housing, wherein a first connection between the housing and the mounting plate is remote from the sensing area, and wherein a second connection between the housing and the sensing device is remote from the sensing area;
    wherein a portion of the housing is positioned through an opening of the mounting plate, and wherein the housing has one or more locking arms that abut against the mounting plate to form the first connection; and
    wherein the housing has one or more fastening structures that are positioned partially through corresponding holes in the sensing device to form the second connection.

14. The apparatus of claim 13, wherein the one or more fastening structures are heat staked into the corresponding holes in the sensing device.

15. A method of sensing pressure comprising:
    providing a conduit to supply a fluid;
    providing a mounting plate in proximity to the conduit;
    press fitting the conduit into a coupling device of a sensor assembly for communicating the fluid to a sensing area of the sensor assembly;
    positioning a housing of the sensor assembly partially through an opening in the mounting plate;
    connecting the housing with the mounting plate; and
    translating at least one of an axial force, a traverse force and a torsional force associated with the conduit to one or more connection points of the sensor assembly that are remote from the sensing area of the sensor assembly.

16. The method of claim 15, further comprising translating the axial force and the traverse force associated with the conduit to the one or more connection points of the sensor assembly that are remote from the sensing area of the sensor assembly.

17. The method of claim 15, further comprising translating the axial force, the traverse force and the torsional force associated with the conduit to the one or more connection points of the sensor assembly that are remote from the sensing area of the sensor assembly.

18. The method of claim 15, further comprising connecting the housing with the mounting plate by a twisting motion.

19. The method of claim 15, further comprising connecting the housing of the sensor assembly with a sensing device containing the sensing area by heat staking one or more posts positioned along a periphery of the housing.

20. The method of claim 15, further comprising connecting the housing with the mounting plate by bending one or more locking arms when the housing is passed through the opening in the mounting plate and abutting the one or more locking arms against the mounting plate.

21. A pressure sensing apparatus connectable with a supply conduit and a mounting plate, the apparatus comprising:
    a housing being removably connectable with the mounting plate, and further being removably connectable with the supply conduit;
    the housing having one or more locking arms that abut against the mounting plate to form a removable connection;
    a pressure sensing device having a sensing structure and being connected to the housing, the sensing structure being in fluid communication with the supply conduit; and
    the housing extending through an opening in the mounting plate such that the housing is removably connectable to the supply conduit adjacent a first side of the mounting plate, and the pressure sensing device is connected to the housing adjacent a second opposite side of the mounting plate.

22. The pressure sensing apparatus of claim 21 wherein the one or more locking arms pass through the mounting plate before abutting against the first side of the mounting plate, and wherein the one or more locking arms bend as they pass through the mounting plate.

* * * * *